NAIL-UP BRACKET FOR WIRING BOXES

Filed Oct. 29, 1965

2 Sheets-Sheet 1

INVENTOR
Lewis E. Palmer

BY Griesbauer & Laubscher
ATTORNEY

INVENTOR
Lewis E. Palmer

BY Griesbauer & Laubscher
ATTORNEYS

United States Patent Office 3,345,029

Patented Oct. 3, 1967

3,345,029
NAIL-UP BRACKET FOR WIRING BOXES

Lewis E. Palmer, Washington, W. Va., assignor to Union Insulating Company, Inc., Parkersburg, W. Va., a corporation of West Virginia Filed Oct. 29, 1965, Ser. No. 505,660
7 Claims. (Cl. 248—300)

ABSTRACT OF THE DISCLOSURE

A sheet metal nail-up bracket for electrical boxes, characterized by the provision of a pair of nail-guiding passageways formed in the bracket to define an acute angle relative to the surface of the support to which the bracket is fastened.

This invention relates generally to a nail-up bracket for fastening an electrical wiring box or the like to a support, and more particularly to a bracket formed from relatively thin sheet material, preferably of metal, and containing a plurailty of nail-guiding passageways through which nails are driven to effect rigid fastening of the bracket to the support. The nail-guiding passageways are generally convergent and preferably lie in a common plane that defines an acute angle relative to the surface of the support to which the bracket is fastened.

It has been proposed in the patented prior art to provide metal brackets for fastening an electrical wiring box to a woden support such as a beam, joist, stud or the like. Examples of such known brackets are presented in the patents to Cluny No. 1,853,203, Walters No. 2,252,953, and Cooper No. 2,406,587, all of which have now expired. In these known brackets, it is normally quite difficult to rapidly nail to a support a bracket to which an electrical box has been previously attached. The difficulties in securing the box to the bracket and in fastening the bracket to a support are particularly troublesome in the case where the electrical box is formed by molding from a synthetic plastic or other moldable insulating material. In order to expedite the fastening of the box to the support and to alleviate the chances of damage to the box, it has been proposed in the copending patent application Serial No. 497,866 filed October 19, 1965, in the name of David W. Kinney entitled "Improved Molded-Insulation Electrical Box" to form in external ear portions integral with the box a plurality of convergent nail-guiding passageways that are so arranged that nails may be rapidly driven at such an angle relative to the central longitudinal plane of the box that the danger of damage of the box by a hammer blow is substantially eliminated. The present invention was developed to provide an improved, versatile, inexpensive bracket that may be used to secure various types of electrical boxes to a support, said bracket normally being a separate element adapted for attachment to the wiring box, whereby the use of expensive apparatus for molding various types of boxes with integral ears is avoided.

The primary object of the present invention is to provide a bracket formed from relatively thin sheet material and adapted to fasten a wiring box or the like to a support, said bracket including means defining convergent nail guiding passageways. In accordance with the preferred form of the invention, the bracket includes a first section adapted for engagement with the box, and a second section adapted for engagement with the support. Preferably these two sections are normal to each other, and the nail guiding passageways lie in a common plane having an acute angle relative to the support surface to which the bracket is fastened.

A more specific object of the invention is to provide a bracket of the type described above, said bracket being formed of relatively thin sheet metal and including first and second sections bent at right angles. The first section is generally rectangular and includes triangular corner tabs that are bent outwardly at right angles from said first section. In accordance with first and second embodiments of the invention, these tabs are bent on the opposite and same sides, respectively, from said first section as said second section. Contained within the bracket are a plurality of nail guiding passageways which include, in successive alignment, an opening in the corner tab, a bore in the first section, and an aperture in the second section. Furthermore, the first section is deformed to define nail grooves that communicate with said bores to further guide guide the nails. These nail guiding passageways converge toward the central transverse plane of the bracket, and lie in the aforementioned common plane.

A further object of the invention is to provide a bracket of the type described above, said bracket including means on said first section between said passageways adapted for rigid connection with the electrical wiring box. In the preferred embodiment, there is provided on said first section a coplanar extension that extends outwardly away from said second section, said extension containing apertures for receiving securing means, such as rivets or the like, by which the bracket is connected with the electrical box. Consequently the bracket is adapted for use with boxes having many different configurations and formed of many different materials.

Other objects and advantages of the invention will become apparent from a study of the following specification, when considered in conjunction with the accompanying drawing, in which.

Figures 4, 5:
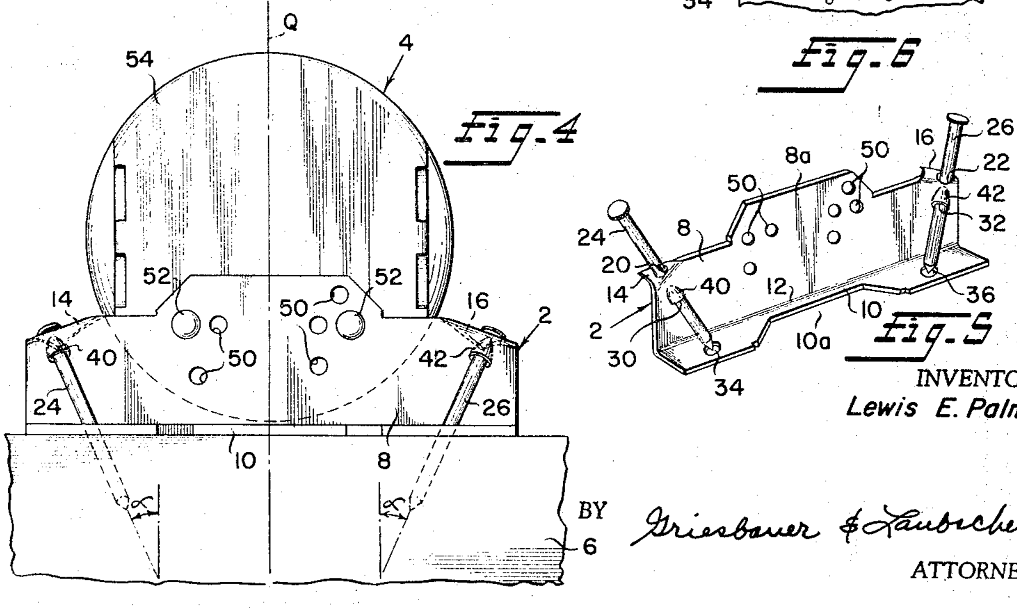
FIGURE 5 is a perspective rear view of the nail-up bracket illustrating two nails in the captively guided position.

Referring to the drawing, the nail-up bracket 2 is adapted for fastening an electrical wiring box 4 or the like to a wooden support 6. As shown in FIGURE 5. the bracket 2 includes first and second orthogonally arranged sections 8 and 10 joined by the fold line 12. The first section 8 is of generally rectangular configuration and includes at its free corners bent triangular tabs 14 and 16 that extend substantially at right angles to the first body section 8 from the opposite side thereof than the second section 10. The corner tabs 14, 16 contain openings 20, 22 adapted to slidably receive conventional nails 24 and 26, respectively.

Figure 1:
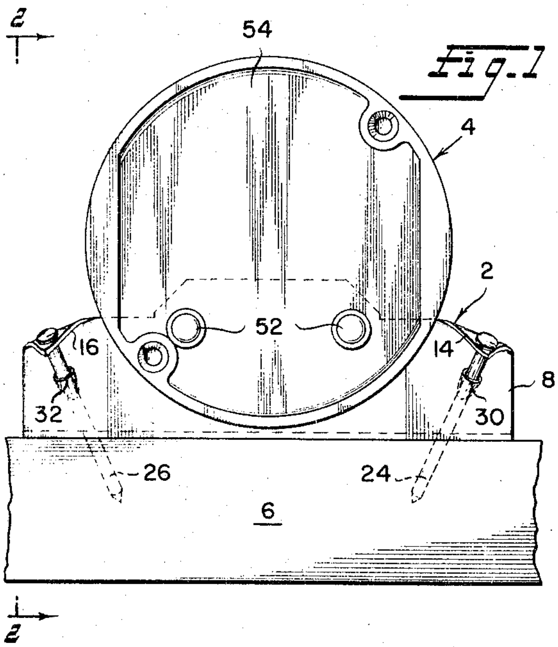
FIGURE 1 is a front elevation view illustrating the manner in which the nail-up bracket of the present invention is utilized to mount a circular electrical wiring box upon a support.
Figure 2:
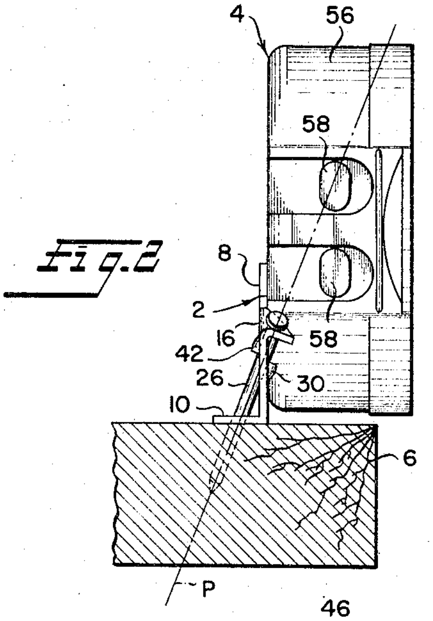
FIGURE 2 is a sectional view taken along line 2—2 of FIGURE 1.
Figure 3:
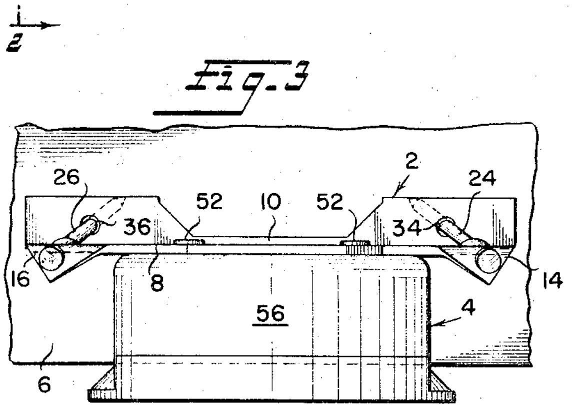
FIGURES 3 and 4 are top plan and rear elevational views, respectively, of the device of FIGURE 1.

The nails 24, 26 extend rearwardly and downwardly through bores 30, 32 contained in the first section 8, and downwardly through correspondingly aligned apertures 34, 36 contained in the second section 10. Adjacent the bores 30 and 32, the first section 8 includes pressed deformations 40 and 42 defining grooves that communicate at their ends with the respective bores and guide the nails 24 and 26, respectively. These grooves, together with the openings 20, 22, the bores 30, 32 and the apertures 34, 36, are so arranged and so cooperate as to define nail guiding passageways that lie in a common plane P (FIGURE 2) that is angularly arranged relative to the surface of the support 6, and converge at a common angle $\alpha$ to the central plane Q (FIGURE 4) that is normal to the fold line 12.

Figure 6:
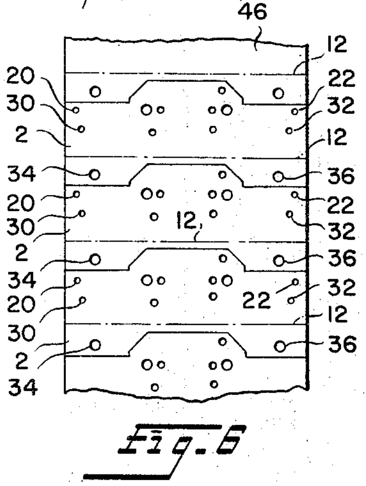
FIGURE 6 is a diagrammatic plan view illustrating the waste-free manner in which the brackets are formed from a strip of sheet metal.

The bracket bodies 2 are stamped from a sheet metal strip 46 in a waste-free manner as shown in FIGURE 6. More particularly, each of the first sections 8 includes a centrally arranged coplanar extension 8*a*, and each of the second sections contains a corresponding cut-out portion 10*a*. The central portion of the first body section 8 contains a plurality of apertures 50 through which rivets 52 (or other securing means such as bolts or the like) are utilized to secure the bracket section 8 to the bottom wall 54 of the outlet or wiring box 4. The wiring box 4, which may be molded from suitable electrical insulating material, includes a cylindrical side wall 56 which contains knock-outs 58 through the resulting openings of which the electrical leads are introduced for connection with a switch, receptacle or other electrical device that is mounted within the box.

Assume that the central portion 8*a* of bracket section 8 is rigidly secured to an electrical box 4, and that nails 24 and 26 are inserted in the nail-guiding passageways as shown in FIGURE 5. By proper relative arrangement of the openings 20, 22, bores 30, 32 and apertures 34, 36 and by proper formation of the grooves by the deformations 40, 42, the nails are frictionally maintained captive in the positions shown in FIGURE 5. Following the desired positioning of the bracket and box relative to the support, the nails 24, 26, which lie in the common plane P and have an angle of convergency which is twice the angle $\alpha$, are initially tapped to effect slight penetration of the nails into the support (and thereby rigidly mount the box in place), whereupon the nails are fully driven into the support by full hammer strokes. Owing to the convergency of the nail-guiding passageways, nails of relatively short length may be used for fastening the bracket to the support.

The nails are quickly driven into the support until the nail heads engage the tabs 14 and 16, respectively. Owing to the angular relationship of the nails relative to the central plane Q and to the spaced relationship of the nail-guiding passageways relative to the box 4, rapid driving of the nails into the support is permitted without damage to the box or, in the case of a pre-wired box, to the electrical leads or devices associated therewith. Owing to the angular relationship between the plane P containing the nails and the lower surface of the second section 10 of the bracket, the bracket is moreover stabilized against pivotal movement about the fold line 12 relative to the support 6.

Although the bracket has been disclosed as being formed by bending from a punched metal sheet, in the alternative the bracket could be formed of other materials (such as a synthetic plastic material, for example), or by other manufacturing methods (for example, by casting, extrusion or the like). Moreover, instead of forming the bracket as a separate element, it is apparent that it could be made integral with the wiring box in certain instances, if desired.

Figure 7:
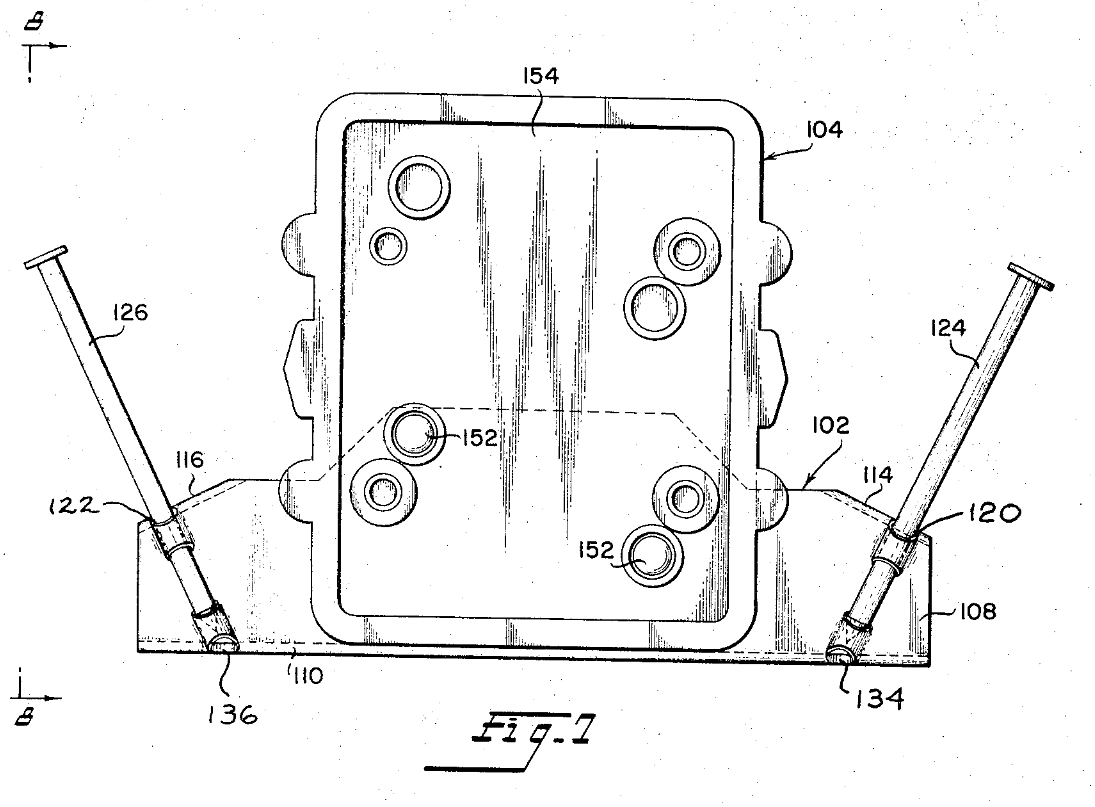
FIGURES 7 and 8 are front and side views of a second bracket embodiment connected with a molded insulation wiring box having a rectangular configuration.
Figure 8:
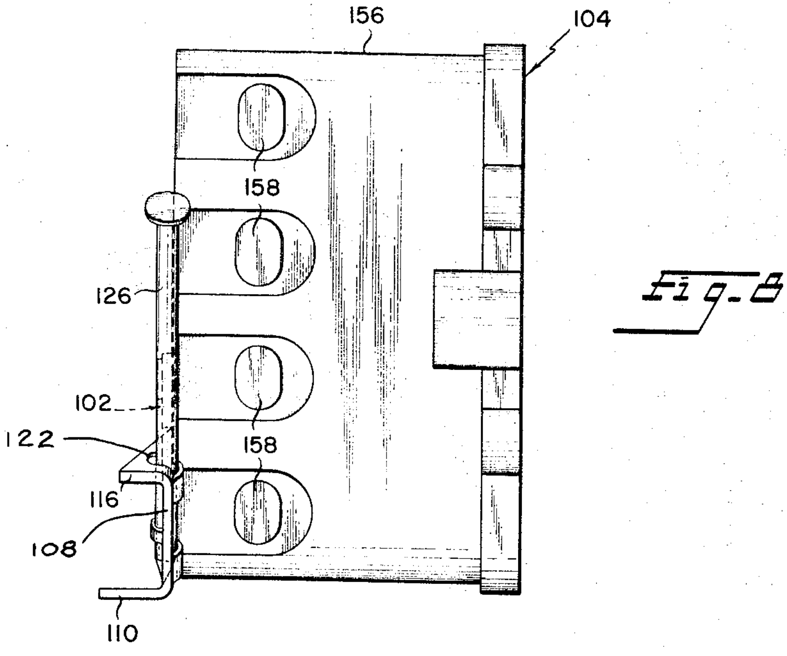

Referring now to the embodiment of FIGURES 7 and 8, the sheet metal bracket 102 includes generally triangular corner tabs 114, 116 that are bent toward the same side from the vertical section 108 as the horizontal section 110. As shown in FIGURE 7, the bracket includes a pair of convergent nail-guiding passageway means for guiding the nails 124 and 126, respectively. These passageways are coplanar and lie in the plane of the vertical section 108 as shown in FIGURE 8. The passageways include, in successive alignment, openings 120 and 122 contained in the tabs 114 and 116, respectively, bores contained in the vertical section 108, and apertures 134 and 136 contained in the horizontal section 110 adjacent the line of juncture thereof with the section 108. Owing to the pressed deformations of the section 108 adjacent the bores therein, and to the relative locations of the openings and apertures, the nails 124, 126 are held in a captive slidably guided condition. Although the bracket 102 has been illustrated as being connected by rivets 152 to the bottom wall 154 of a molded insulation electrical box 104 having a rectangular configuration, it is apparent that this bracket modification could be utilized for connecting to a support various types of electrical boxes of other configurations and compositions.

While in accordance with the provisions of the patent statutes, the best form and embodiment of the invention has been illustrated and described, it will be apparent to those skilled in the art that various modifications may be made in the apparatus described without deviating from the invention set forth in the following claims.

What is claimed is:

1. A nail-up bracket for fastening an electrical box to a support, comprising a unitary body member formed of sheet material and including first and second orthogonally arranged sections joined by a common first fold line, said first section being generally rectangular and including at each of the two corners thereof remote from said first fold line a corner tab portion bent along a second fold line angularly arranged relative to said first fold line, each of said corner tab portions being generally normal to said first section, said first section containing a pair of bores defining convergent nail guiding passageways which extend from said second fold lines, respectively, in the direction of said first fold line, said corner tab portions containing entrance openings each in alignment with one end of one of said passageways, respectively, and said second sections containing exit apertures each in alignment with the other end of the other of said passageways, respectively, whereby when said second section is positioned against a support, convergent nails may be driven through said openings, passageways, and apertures, respectively, into said support.

2. A nail-up bracket as defined in claim 1, wherein said corner tabs are bent outwardly from the opposite side of said first section than said second section, and further wherein said nail-guiding passageways lie in a plane parallel with said fold line and defining an acute angle relative to said second section.

3. A nail-up bracket as defined in claim 1, wherein said corner tabs are bent outwardly from the same said of said first section as said second section, and further wherein said nail-guiding passageways lie in a plane parallel with said first section.

4. A nail-up bracket as defined in claim 1, wherein said nail-guiding passageways define the same acute angle relative to a plane normal to said first fold line and centrally arranged between said passageways.

5. Apparatus as defined in claim 1 wherein said body member is formed of metal.

6. A nail-up bracket as defined in claim 1, wherein said first section contains adjacent each of said bore means a deformed portion defining a groove communicating at one end with said bore, said groove being arranged to guide a nail when inserted through said tab opening, said first section bore means and said second section aperture.

7. Apparatus as defined in claim 6, and further including a wiring box connected with the first section of said bracket between and spaced from said nail-guiding passageways, respectively.

References Cited

UNITED STATES PATENTS

| | | | |
|---|---|---|---|
| 1,123,107 | 12/1914 | Darr | 248—300 X |
| 2,328,421 | 8/1943 | Carlson et al. | 248—300 |
| 2,453,467 | 11/1948 | Smith | 248—300 X |
| 2,757,817 | 8/1956 | Egan | 220—3.5 |
| 2,802,634 | 8/1957 | Everett | 248—300 |
| 3,011,747 | 12/1961 | Magee | 220—3.9 X |

ROY D. FRAZIER, *Primary Examiner.*

J. F. FOSS, *Assistant Examiner.*

UNITED STATES PATENT OFFICE

CERTIFICATE OF CORRECTION

Patent No. 3,345,029 October 3, 1967

Lewis E. Palmer

It is hereby certified that error appears in the above numbered patent requiring correction and that the said Letters Patent should read as corrected below.

Column 1, line 31, for "woden" read -- wooden --; column 4, line 57, for "same said" read -- same side --.

Signed and sealed this 5th day of November 1968.

(SEAL)
Attest:

Edward M. Fletcher, Jr.
Attesting Officer

EDWARD J. BRENNER
Commissioner of Patents